March 17, 1953 W. P. MASON 2,632,048

LIGHT VALVE FOR TELEVISION SYSTEMS

Filed Jan. 28, 1950 11 Sheets-Sheet 1

INVENTOR
W. P. MASON
BY Hugh S. Wertz
ATTORNEY

INVENTOR
W. P. MASON
BY Hugh S. Wertz
ATTORNEY

March 17, 1953 W. P. MASON 2,632,048

LIGHT VALVE FOR TELEVISION SYSTEMS

Filed Jan. 28, 1950 11 Sheets-Sheet 3

INVENTOR
W. P. MASON
BY Hugh S. Wertz
ATTORNEY

March 17, 1953 W. P. MASON 2,632,048

LIGHT VALVE FOR TELEVISION SYSTEMS

Filed Jan. 28, 1950 11 Sheets-Sheet 4

INVENTOR
W. P. MASON
BY Hugh S. Wertz
ATTORNEY

March 17, 1953 W. P. MASON 2,632,048

LIGHT VALVE FOR TELEVISION SYSTEMS

Filed Jan. 28, 1950 11 Sheets-Sheet 5

INVENTOR
W. P. MASON
BY Hugh S. Wertz
ATTORNEY

March 17, 1953 W. P. MASON 2,632,048
LIGHT VALVE FOR TELEVISION SYSTEMS
Filed Jan. 28, 1950 11 Sheets-Sheet 6

INVENTOR
W. P. MASON
BY
Hugh S. Wertz
ATTORNEY

March 17, 1953 W. P. MASON 2,632,048

LIGHT VALVE FOR TELEVISION SYSTEMS

Filed Jan. 28, 1950 11 Sheets-Sheet 7

INVENTOR
W. P. MASON
BY Hugh S. Wertz
ATTORNEY

March 17, 1953 W. P. MASON 2,632,048

LIGHT VALVE FOR TELEVISION SYSTEMS

Filed Jan. 28, 1950 11 Sheets-Sheet 8

INVENTOR
W. P. MASON
BY Hugh S. Wertz
ATTORNEY

INVENTOR
W. P. MASON
BY Hugh S. Wertz
ATTORNEY

INVENTOR
W. P. MASON
BY Hugh S. Wertz
ATTORNEY

INVENTOR
W. P. MASON
BY Hugh S. Wertz
ATTORNEY

Patented Mar. 17, 1953

2,632,048

UNITED STATES PATENT OFFICE 2,632,048

LIGHT VALVE FOR TELEVISION SYSTEMS

Warren P. Mason, West Orange, N. J., assignor to Bell Telephone Laboratories, Incorporated, New York, N. Y., a corporation of New York Application January 28, 1950, Serial No. 141,135

3 Claims. (Cl. 178—6)

This invention relates to electro-optical image-producing and light-modulating apparatus and methods, and is particularly applicable to television and the like.

In commonly used television systems, there is transmitted at any one moment, information as to the luminosity or brightness of only one picture element. The picture elements are scanned individually, and information as to their luminosity is transmitted, one after another.

One object of the invention is to provide apparatus and a method for use in a television system in which information as to the luminosity of a plurality of picture elements is simultaneously transmitted. In one embodiment of the invention, information as to all the picture elements is simultaneously transmitted, and no scanning whatsoever is necessary. In another embodiment, there is transmitted, at any one moment, information as to a plurality of but less than all of the picture elements, and some scanning is necessary, but the speed of scanning may satisfactorily be less than that employed in systems in which the picture elements are scanned individually, for results of a given quality.

One advantage of systems employing the present invention is that they do not require as great a band width for transmission as do other systems.

Another object of the invention is to modulate light with the aid of a compressional wave of ultrasonic frequency.

Still another object is to generate a composite signal comprising component signals of different frequency, the amplitudes of the component signals being respectively related to the luminosity of different elementary areas of a field of view.

A feature of one embodiment of the invention is the provision, in a television receiver adapted simultaneously to direct individually-modulated light beams onto the picture elements of a screen, of piezoelectric means for producing a traveling compressional wave having, for each of these picture elements, a frequency component or a narrow band of frequency components, means for separating in space the frequency components of the compressional wave into different compressional beams, and means for directing light perpendicularly through each of the compressional beams and finally onto the screen.

Figure 1:
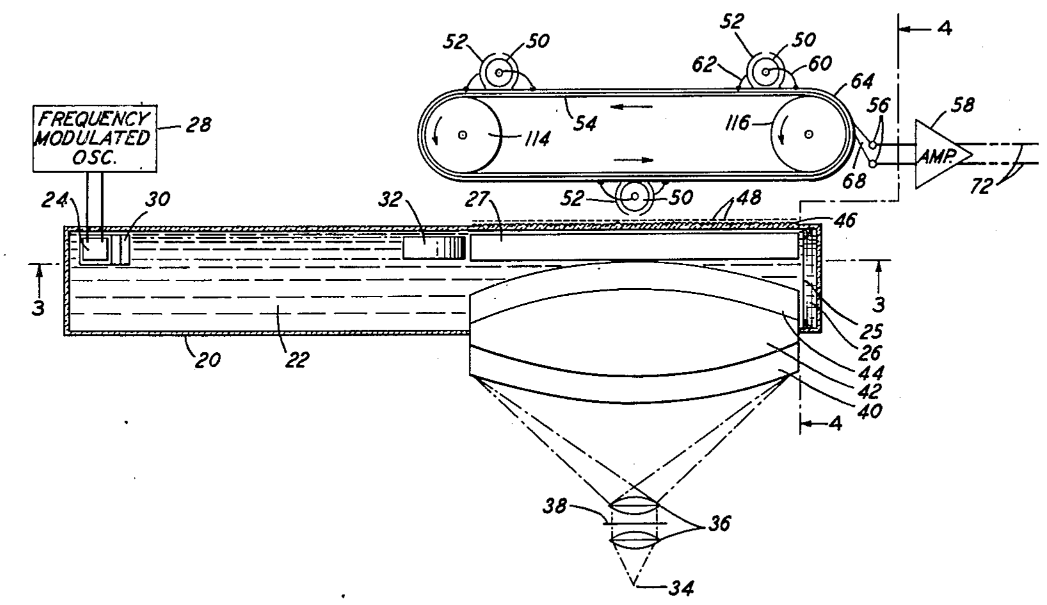
Figure 2:
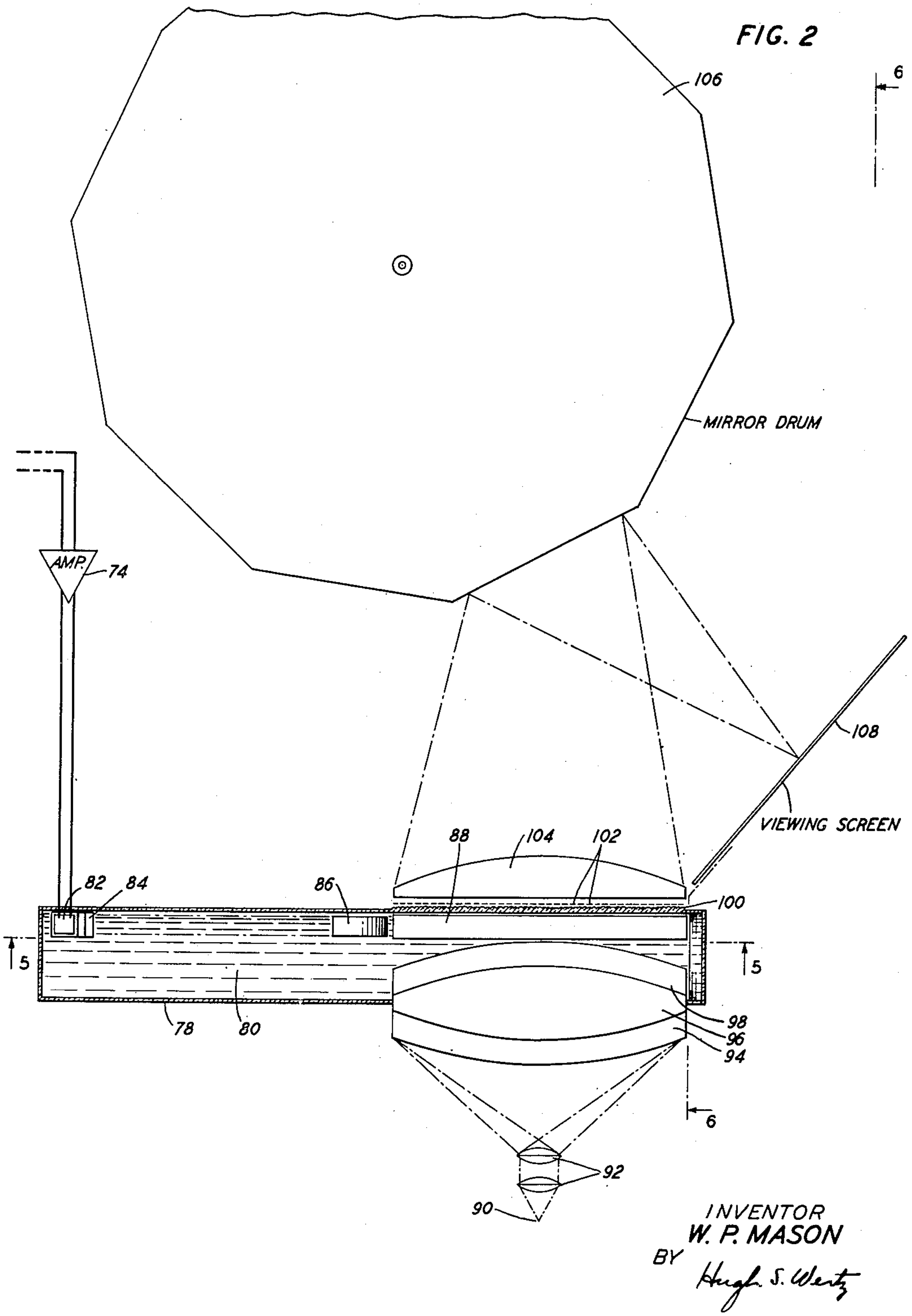
Figure 3:
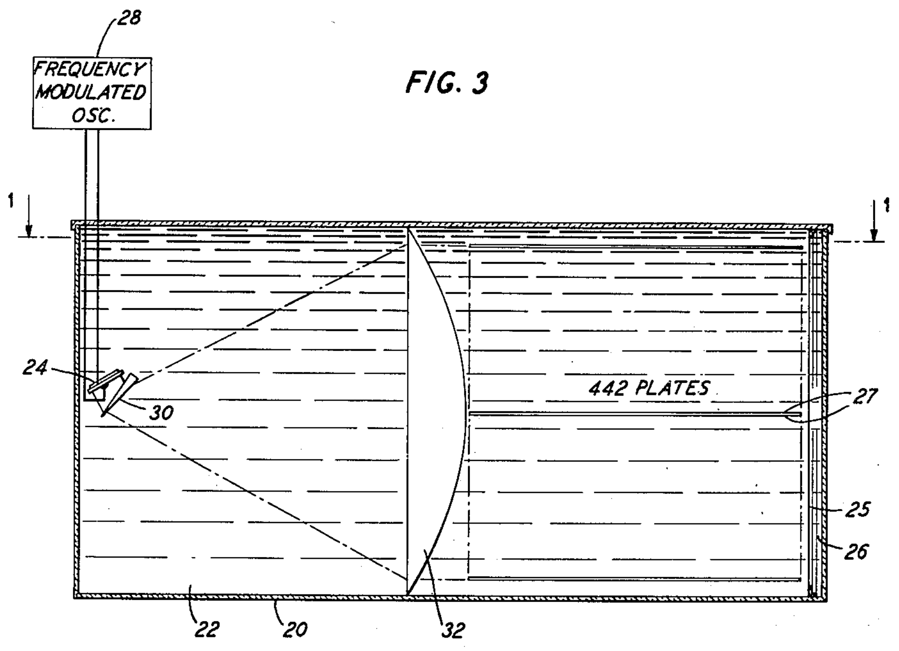
Figure 4:
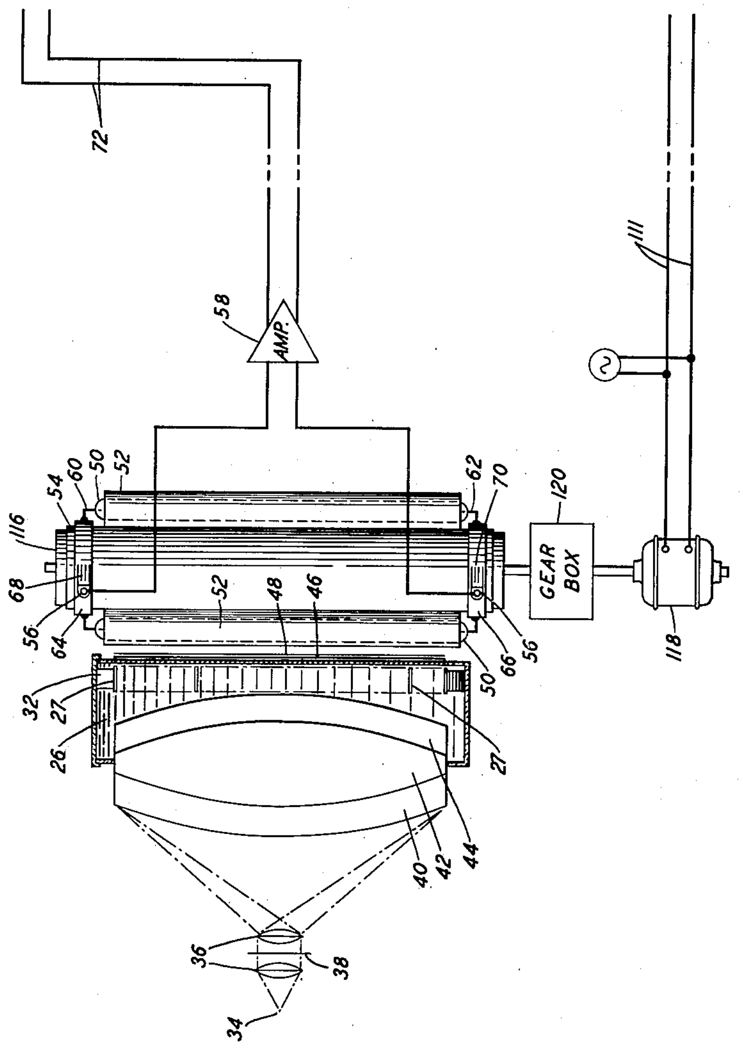
Figure 5:
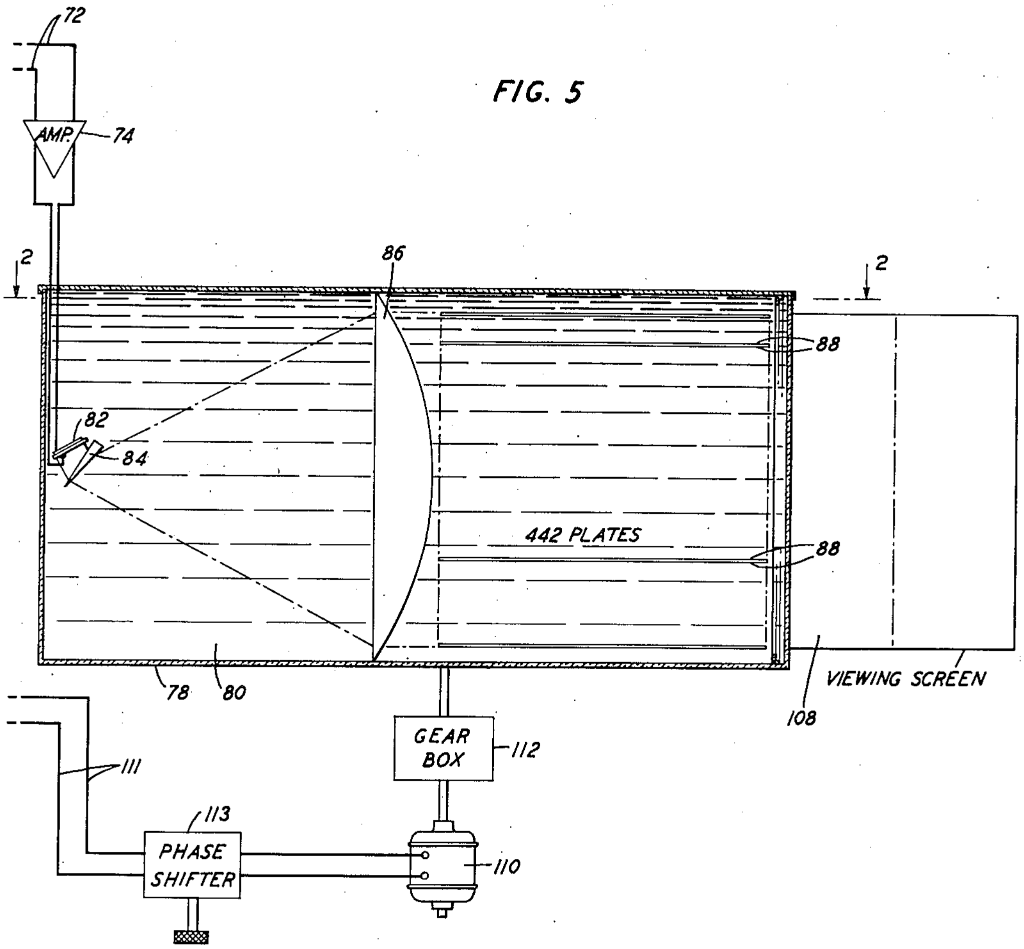
Figure 6:
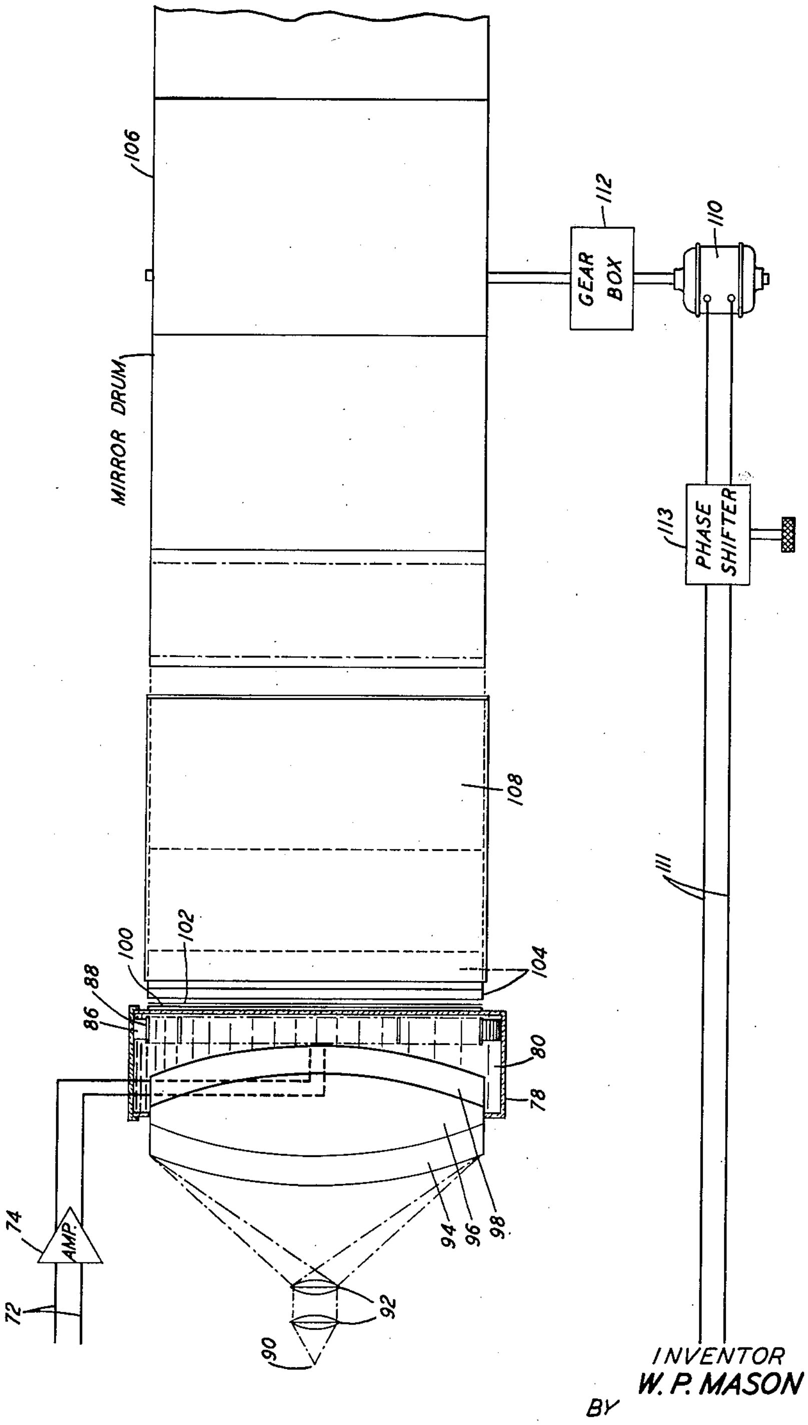

The above-mentioned, as well as other objects, together with the many advantages obtainable by the practice of the present invention, will be readily comprehended by persons skilled in the art by reference to the following detailed description taken in connection with the annexed drawings, which respectively describe and illustrate preferred embodiments of the invention, and wherein:

Figs. 1 through 6 represent a first embodiment of a television system. In this embodiment Fig. 1 is a plan view of components at a transmitting station, and Fig. 2 is a plan view of components at a receiving station. Fig. 3 is a vertical sectional view through a portion of the transmitting system, the position of the sectional plane being indicated at 3—3 in Fig. 1. A major portion of Fig. 3 represents a tank including a fluid, transparent medium, and means for generating and controlling a compressional wave in the medium. Fig. 4 is another vertical sectional view of a portion of the transmitting system shown in Fig. 1, taken in a broken sectional plane indicated at 4—4 in Fig. 1. Fig. 5 is a vertical sectional view of a portion of the receiving system, the position of the sectional plane being indicated at 5—5 in Fig. 2. Fig. 6 is another vertical sectional view of a portion of the receiving system, taken in a broken sectional plane indicated at 6—6 in Fig. 2.

Figure 7:
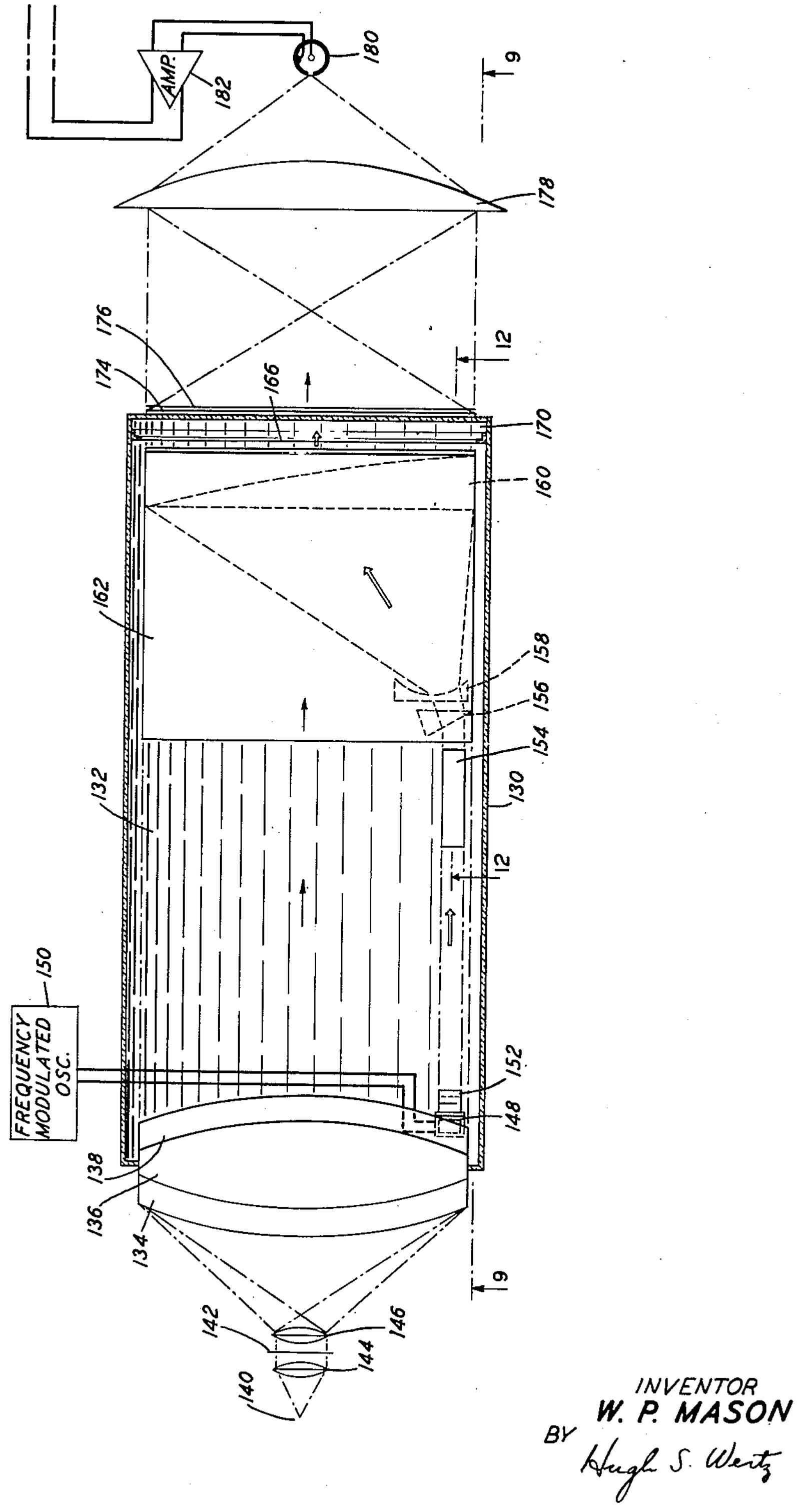
Figure 8:
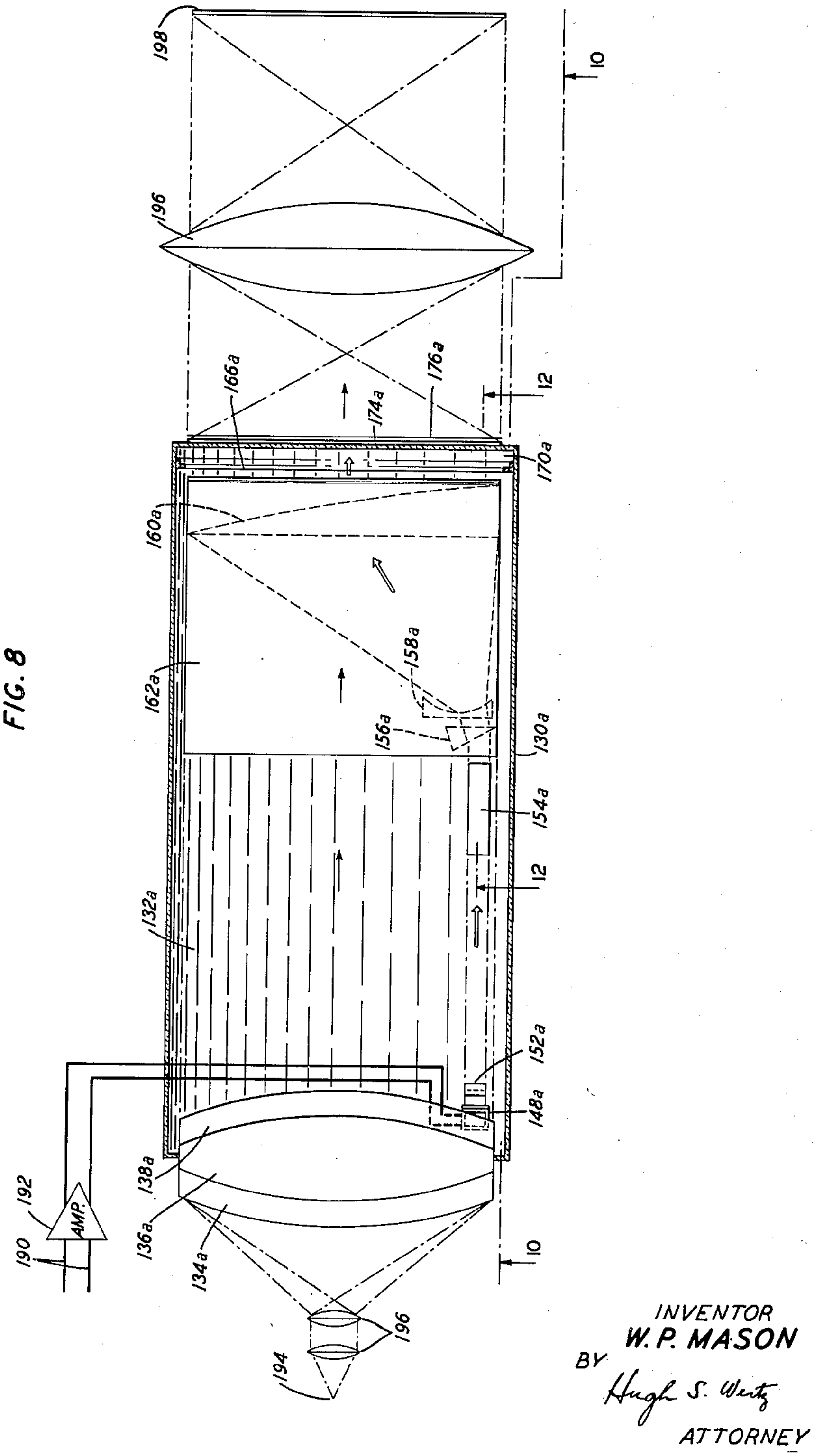
Figure 9:
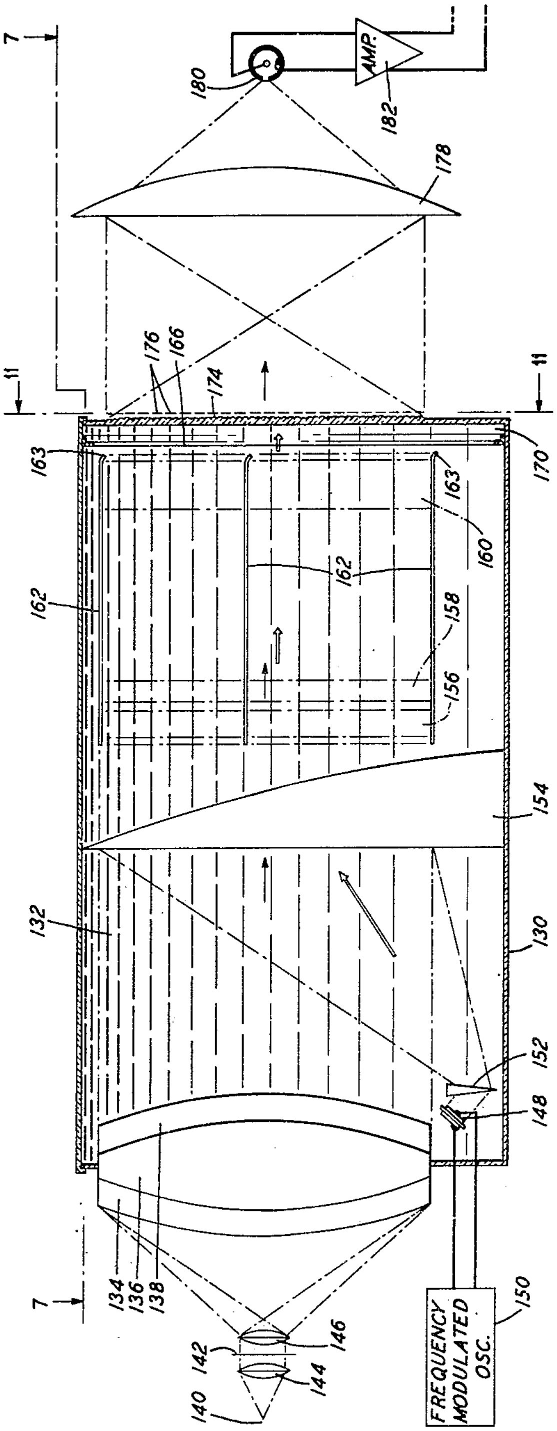
Figure 10:
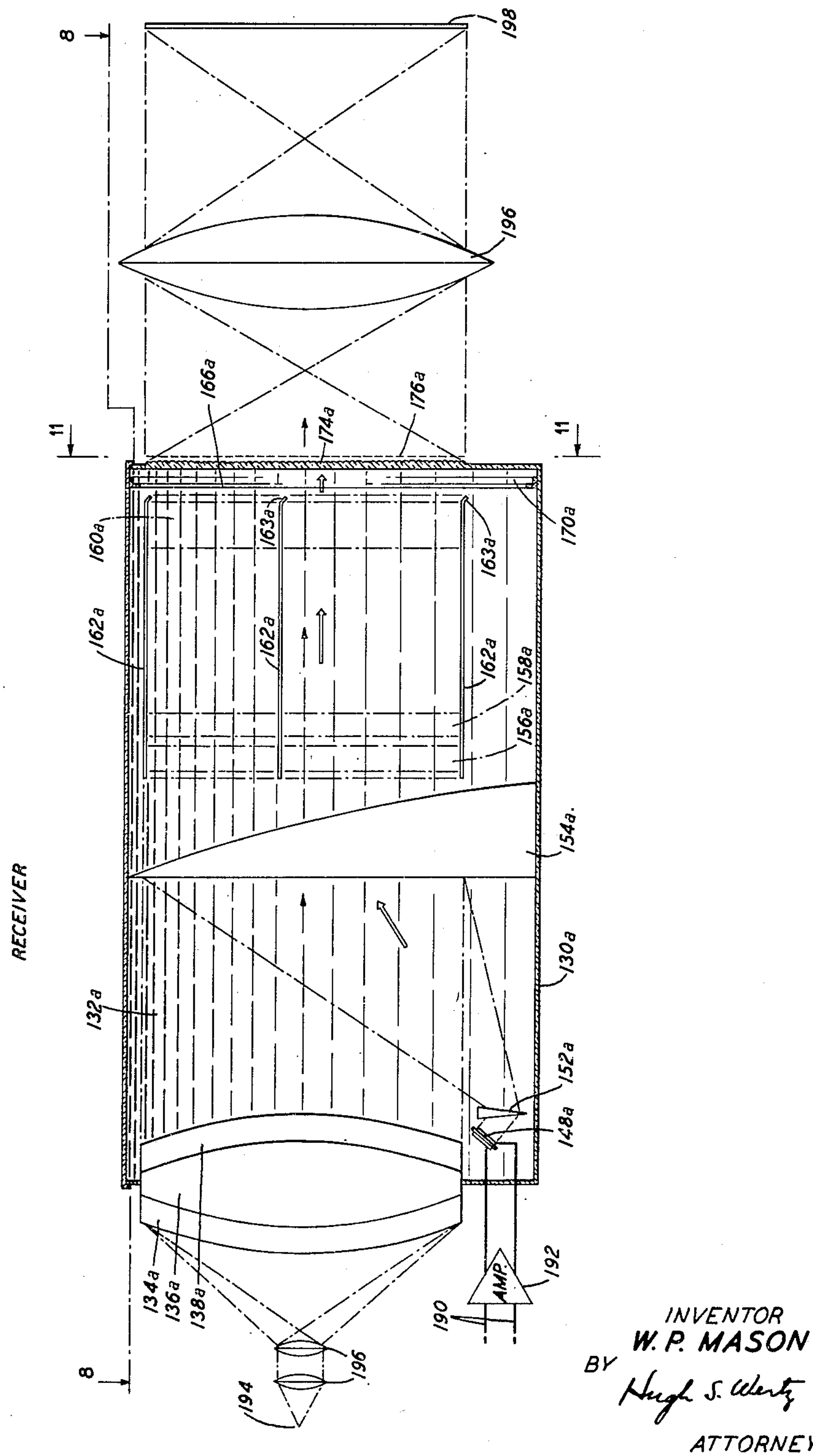
Figure 12:
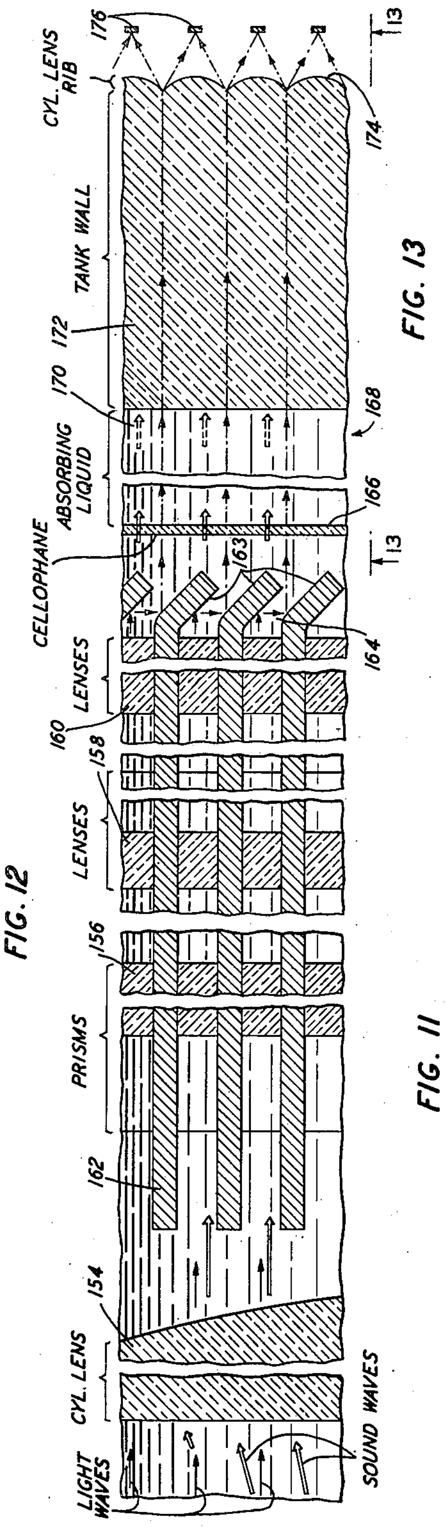
Figure 13:
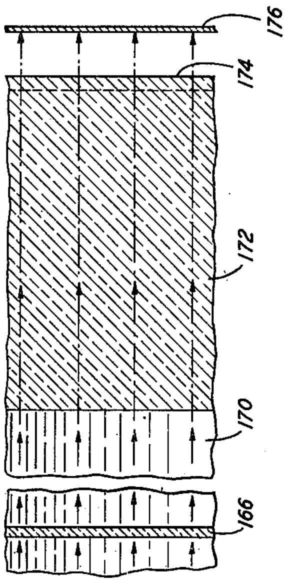
Figure 11:
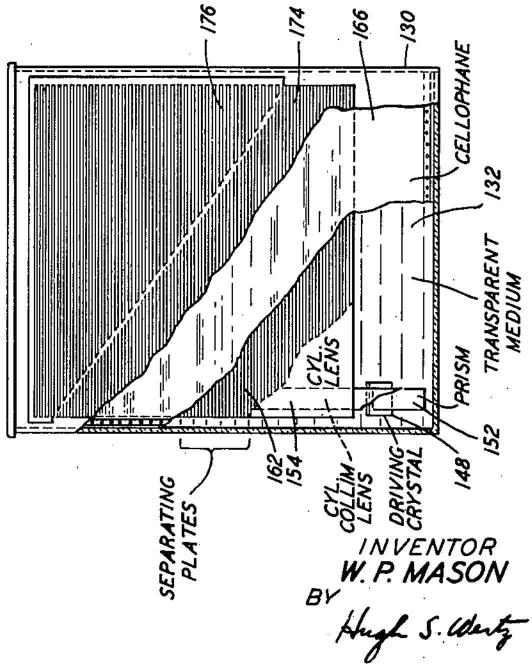

Figs. 7 through 13 represent a second embodiment of a television system. In this embodiment Fig. 7 represents, in plan view, components at a transmitting station, and Fig. 8 represents, in plan view, components at a receiving station. Fig. 9 is a vertical sectional view through a portion of the transmitting system, the position of the sectional plane being indicated at 9—9 in Fig. 7. Fig. 10 is a vertical sectional view through a portion of the receiving system, taken along a broken plane, the position of the sectional plane being indicated at 10—10 in Fig. 8. Fig. 11 is a vertical sectional view of apparatus which is of similar construction in the transmitting and receiving system, the position of the sectional plane for the transmitting apparatus being indicated at 11—11 in Fig. 9 and for the receiving apparatus at 11—11 in Fig. 10. Certain elements are broken away in Fig. 11 for clarity of illustration. Fig. 12 is an enlarged vertical sectional view through a portion of apparatus which is of similar construction in the transmitting and receiving systems, the position of the sectional plane for the transmitting system being indicated at 12—12 in Fig. 7 and for the receiving system at 12—12 in Fig. 8. Fig. 13 is a horizontal sectional view through a portion of the apparatus shown in Fig. 12, looking up, the position of the sectional plane being indicated at 13—13 in Fig. 12.

*First embodiment*

In the television system to be described in connection with Figs. 1 through 7, at any one instant there are transmitted signals defining the luminosity of all the picture elements of a single, complete line or strip extending vertically across the picture. If the picture is considered divided into 441 vertical lines, these various lines are transmitted one at a time as a complex wave including a series of frequency components. This complex wave may be transmitted directly, or, more usually, may be employed to modulate a supplementary carrier of radio frequency or some other frequency, for transmission purposes. The individual frequency components of the complex wave correspond to and carry information as to the luminosity of the individual picture elements of the line being transmitted. More particularly, the amplitude of a particular frequency component is determined by the luminosity of its associated picture element.

The scanning from line to line is, in this first embodiment, illustrated as being accomplished by mechanical means. The transmission of intelligence as to the various picture elements of the lines is accomplished by what may be called frequency-division means. Hence this first embodiment may be referred to as a partial frequency-division system.

At the transmitter, the complex electrical signal corresponding to a particular line is generated with the aid of a novel type of ultrasonic device in combination with a photoelectric device. This apparatus is, in some respects, similar to an ultrasonic light valve, but its purpose is to superpose, upon the light rays originating at different picture elements of a line of the field of view, variations at different ultrasonic frequencies, whereby these different ultrasonic frequencies are somewhat in the nature of carriers, modulated in accordance with the luminosity of the different picture elements. The light rays, thus varying, strike a photoelectric device which produces a complex electrical wave corresponding to a single line of picture elements.

The ultrasonic device will be described in more detail but it may now be stated that it includes a translucent or transparent medium such as a tank of liquid, a piezoelectric crystal together with electrical means driving same for generating a complex, traveling compressional wave including a plurality of frequency components of substantially equal amplitude, and a prism for dividing or physically spreading out this complex compressional wave into separate beams of different frequency. These beams may be arranged in layers. Light from the field of view is directed through the transparent medium so that light from individual picture elements passes through individual compressional beams, perpendicular to the direction of propagation of the compressional beams. Each of the compressional beams acts somewhat like a diffraction grating, producing a diffraction pattern which is directed toward a bar-slit arrangement, and also has a cyclical attenuating effect, resulting in a modulation of the light at the ultrasonic frequency of the compressional beam in question. The photoelectric device collects the light rays, which, as stated, originate from the picture elements of a single line of the field of view. To produce the scanning action, whereby successive lines of the picture are transmitted, the photoelectric device is mechanically moved with respect to the ultrasonic device.

If transmission from the transmitter to the receiver makes use of a supplementary carrier, there will be provided, at the receiver, suitable demodulating means to recover its complex modulation envelope.

At the receiver, an ultrasonic light valve generally similar to the ultrasonic device at the transmitter is employed. The light valve at the receiver includes a piezoelectric crystal for generating in a transparent medium a traveling compressional wave including all the frequency components of the received signal, and a prism for dividing this wave into various beams, different beams corresponding to the different frequency components of the received signal. The amplitudes of these different ultrasonic beams generated at the receiver will at any instant be determined by the luminosity of the different picture elements of the line then being transmitted. Light is directed through the light valve at the receiver, and thence through an optical system including a rotating mirror drum having a number of faces, being finally focussed as a line of light on a screen. The rotary motion of the mirror drum causes this line of light to move across the screen. The mirror drum is synchronized with the motion of the photoelectric device at the transmitter, thereby producing at the receiver line-to-line scanning synchronized with the line-to-line scanning at the transmitter.

It may thus be seen that in the system to be described in connection with Figs. 1 through 7, a complete line of the picture is transmitted at a time, different picture elements of the line being transmitted simultaneously by a frequency-division arrangement, and the line-to-line scanning is mechanically produced.

In Fig. 1 there is shown a tank 20 containing a transparent medium 22, such as water. Toward the left-hand end of the tank there is provided a piezoelectric crystal 24 for setting up traveling compressional waves. On the back of the crystal there may be provided a sponge rubber member to aid in preventing radiation from this side of the crystal.

Extending across the right-hand end of the tank there is a membrane 25 of cellophane, sealing the medium 22 from a zone 26 to the right of the membrane 25. In the zone 26 there is provided an absorbing medium such as castor oil. Cellophane and castor oil each have substantially the same mechanical impedance as water, and as a result, there is practically no reflection of the ultrasonic waves from the water-cellophane boundary or from the cellophane-castor oil boundary.

Reference now is made to Fig. 3. It is desired to set up in the medium 22 as many different compressional beams as there are picture elements in a single line of the transmitted picture. Usually it is considered desirable to employ approximately as many picture elements in a single line as there are lines in the picture. Thus, for example, if the picture is to be divided into 441 lines, there will be 441 picture elements in each line, and consequently it will be desired to set up 441 different beams of compressional waves. In the illustrative embodiment these beams will be arranged in horizontal layers. Horizontal separating plates such as 27, of metal or some material having high acoustic impedance, are provided for preventing the different layer-like compressional beams from interfering with one another. There may be 442 plates, for defining paths for 441 beams.

In the system illustrated, the lines of the picture may be considered to run vertically. The invention is, however, not necessarily limited to such an arrangement.

The piezoelectric crystal 24 is driven by a source of multifrequency electrical signals of ultrasonic frequency. For this purpose there may be provided a frequency-modulated oscillator 28. In other embodiments the source of multifrequency signals might comprise a source of voltage pulses. The signal source is preferably adapted to cause the crystal to set up a continuous spectrum of frequency components of ultrasonic signals, the amplitudes of the various components being equal. A suitable arrangement of this sort is fully described in the book "Electromechanical Transducers and Wave Filters" by W. P. Mason, published by the D. Van Nostrand Company, Incorporated (1948), on pages 230 through 238. For example, it is shown there that by proper loading the frequency response of a crystal can be uniform over a wide range of frequencies. (See the characteristic shown as Fig. 7.9 on page 234.) The crystal can then be driven by a signal source, such as a resistance noise source which, as is well known in the art, produces a continuous spectrum of frequency components of equal amplitude over a wide band. As a result, the crystal will vibrate simultaneously at the various applied frequencies with equal amplitudes, in a manner analogous to a broad band amplifier operating in a frequency multiplex system to provide amplification simultaneously to a number of frequency bands.

The crystal is suspended in the tank at an oblique angle, and there is provided a prism 30, which may be of metal, positioned to receive the compressional waves generated by the crystal. The prism will cause the compressional waves from the crystal to spread out into a series of diverging fan-like beams. A lens 32, of metal or the like, is positioned to receive these beams and to direct them horizontally, longitudinally of the tank.

As shown in Figs. 1 and 4, light from the field of view to be transmitted is directed horizontally through the tank 20, between the plates 27, in a direction parallel to the wave fronts of the compressional waves, that is, perpendicular to their direction of propagation. For this purpose, in the illustration, there is schematically illustrated a source of light at a point 34, lens means 36, a film 38 bearing the picture to be transmitted, and lens means 40, 42 and 44 set into an opening in the wall of the tank. It will be understood that the system is adapted not only for transmission of pictures on film, but for transmission of live scenes. Thus, the means for directing a beam of light through the tank 20 may also be considered to represent suitable means for directing through the tank 20 light derived from a live scene.

Opposite the lenses 40—44 there is a transparent section of the tank having its external surface formed as a series of vertical cylindrical lenses 46, there being one lens for each of the lines to be transmitted, or 441 lenses. Beyond the transparent section 46 there is provided a series of vertical bars 48, having vertical slits therebetween. There is one bar for each line of the picture, or 441 bars, each bar being in front of one of the cylindrical lenses. There is a slit to either side of each bar, or 442 slits.

The apparatus makes use of some of the principles employed in so-called ultrasonic light valves. If a compressional wave of ultrasonic frequency is transmitted through a transparent medium in a first direction, and if light is transmitted through the medium in a direction parallel to the wave fronts of the compressional wave, the light will be diffracted by an amount related to the amplitude of the compressional waves. Thus the alternate zones of compression and rarefaction act somewhat as a diffraction grating.

Attention may now be directed to a layer-like compressional beam shown passing between an adjacent pair of the 442 plates 27. The alignment of the lenses 46 and the bars 48 is such that in the absence of any compressional beam in the medium 22, and hence in the absence of any diffraction of the light, the bars 48 would intercept substantially all the light from the source 34 passing through the medium 22. On the other hand, if a compressional beam is present, this light will be diffracted and the result will be that there will pass through the slits adjacent the bars 48 an amount of light related to the amplitude of the compressional beam. Moreover, since compressed zones of the medium attenuate light to a greater extent than the other zones, the traveling compressional wave serves to produce a cyclical attenuating effect, whereby each light ray transmitted through a particular portion of the medium varies at the frequency of the compressional beam. The greater attenuation for light waves in the compressed zone compared to their attenuation in the rarefied zone is due to the fact that light has to pass through more absorbing matter in the compressed region than in the rarefied region. Because of the nature of the signal source 28, the amplitudes of the compressional beams between the different plates 27 may be assumed to be all substantially equal. The amount of light passing through various portions of the slits will hence be determined by the luminosity of corresponding portions of the film 38. By virtue of the prism 30, the lens 32, and the plates 27, the compressional beam between any pair of adjacent plates corresponds to a particular frequency component or narrow band of components of the complex signal applied to the crystal 24. Thus, for example, the compressional beams between the higher plates may be of higher frequency than those between the lower plates. The effect of the portion of the medium between a particular pair of adjacent plates 27 is to cause light to pass between the bars 48 in the form of a light signal varying at an ultrasonic rate. The frequency of this variation is different for the light passing between different pairs of plates 27. Since the light passing between different pairs of plates originates from different horizontal strips of the film 38, the effect is as if a different ultrasonic frequency component, or "carrier" has been assigned to each of 441 different horizontal strips of the film. While it is convenient to think of the different individual ultrasonic beams as each having a single frequency, it will be understood that each actually has a band of frequencies.

The 441 vertical lenses 46 and bars 48, with their associated slits, may be considered to divide the field of view, in this case the film 38, into 441 vertical lines or strips. The light from one of these vertical lines emerging from a slit will be in the nature of a composite light signal, comprising 441 different ultrasonic frequency components, the amplitudes of the various components being determined by the luminosity of different picture elements which together comprise a single vertical line of the film 38. Means are provided for transmitting an electrical signal determined at any instant by the light passing through one or a small number of the vertical slits, with scanning means arranged so that in progressive fashion the signal corresponds to the light passing through the different slits. For this purpose there is provided a plurality of elongated photocells 50, each provided with an opaque shield 52 having a slit therein. The photocells 50 together with their shields 52 are carried by a continuously-advancing belt 54, being so arranged that one of the photocells passes progressively in front of the various slits between the bars 48, and when this photocell leaves the last slit, at the right-hand end, the next photocell passes in front of the first slit, at the left-hand end. The photocells 50 and their shields 52 are aligned with the slits, and the lenses, so that a vertical line of the picture on the film 38 is picked up by the photocell 50 at any one moment.

Suitable means are provided for connecting the electrodes of the photocells 50 to the input terminals 56 of an amplifier 58. For this purpose, the electrodes of the photocells 50 may be connected via leads 60 and 62 to metallic bands 64 and 66, respectively, carried by the belt 64. The input terminals 56 of the amplifier 58 are electrically connected via brushes 68 and 70 to the bands 64 and 66, and thence to the electrodes of the photocells 50. The photocells 50 may be seen to be connected in parallel.

The amplifier 58 may be considered schematically to represent any suitable transmitting system. It is connected via a suitable transmission channel 72 to a receiving amplifier 74 at a receiving station, shown in Figs. 2, 5 and 6. Thus, the transmitting amplifier 58, transmission channel 72 and the receiving amplifier 74 may be of such type as to effect transmission over a wireless link, an all-metallic communication channel, coaxial cable, wave guide, or other suitable means. Any type of carrier or modulation system may be interposed in the transmission channel.

*Receiver of first embodiment*

At the receiver there is provided a tank 78, and associated means, generally similar to the tank 20 of the transmitter. Within the tank 78 there is provided a transparent medium, such as water. A piezoelectric crystal 82 toward the left-hand end of the tank is adapted to set up ultrasonic compressional waves when driven by the amplifier 74, to which it is connected. The crystal 82 is suspended in the tank 78 at an oblique angle. A prism 84 is positioned to receive the compressional waves generated by the crystal 82, and to cause these waves to spread out into a series of diverging fan-like beams. Instead of a prism, a suitable diffraction grating might be employed for this purpose. The beams from the prism 84 strike a lens 86 and are thereby directed in parallel horizontal layers, longitudinally of the tank 78. A series of 442 parallel horizontal plates 88 is provided for separating the horizontal beams. Light from a source 90 passes through lens means 92 outside the tank and lens means 94, 96 and 98 set in the wall of the tank, thereafter passing between the plates 88. A transparent section 100 is provided in the wall of the tank 78 opposite the lens means 94, 96 and 98. The transparent section 100 has a series of 441 parallel vertical lenses on its exterior surface, generally similar to the lenses 46 at the transmitter. Opposite these lenses there is a series of 441 bars 102, with slits on either side of each bar. The bars 102 are aligned with the lenses 100 in the same manner as was described with respect to the bars 48.

Light passing through all the slits between the bars 102 is received by a single cylindrical lens 104 which directs the light onto one facet of a mirror drum 106 shaped in the form of an equilateral polygon in cross section. The light is reflected by the mirror drum 106 onto a viewing screen 108. The various optical portions of the system are so positioned and aligned that the light passing through the lens 104 is focused as as a vertical line on the screen 108. Suitable means are provided for rotating the mirror drum 106 at such a speed that this vertical line passes across the screen 108 at the same rate as one of the photocells 50 scans the slits between the bars 48 of the transmitter. That is, in this embodiment, the length of time required for one of the photocells 50 to move from the first slit to the last slit is the same as the length of time required for the mirror drum 106 to move the vertical line which it focuses on the screen 108 from one side of the screen to the other. Moreover, the mirror drum 106 is synchronized in phase with the movement of the photocells 50, so that the line on the screen 108 is at the same position as the photocell 50 is with respect to the slits. Thus at the transmitter when light from the vertical line of the picture on the film 38 farthest to the left of this picture is striking the photocell 50, at the receiver the light will be striking a strip at the extreme left of the viewing screen 108. It may be seen that if there are N facets on the mirror drum 106, this drum must make 1/Nth of a rotation each time a photocell 50 makes one complete scan across all the slits.

For driving the mirror drum 106 there is provided a motor 110 mechanically coupled via a gear box 112 to the drum 106. The motor 110 may be a synchronous electric motor driven from a power line 111 carrying alternating current of accurately controlled frequency. Suitable means may be included for adjusting the phase or angular position of the mirror drum 106. For example, there may be provided a phase shifter 113 between the motor 110 and the power line 111.

Power from the same power line, or from a system locked in phase therewith, may be used to drive the scanning mechanism at the transmitter. Thus as shown in Fig. 4, the belt 54, carried by rollers 114 and 116 may be driven by a synchronous electric motor 118 via a gear box 120. The motor 118 may as stated be driven from a source of alternating current having the same frequency and phase as the current which energizes the motor 110 at the receiver. A common power line 111 is shown in the illustration.

It will be understood that in the present embodiment the synchronizing problem is fairly easy, because of the fact that an entire line of the picture is transmitted at a time, and hence the scanning speed is only the line-to-line speed, which is a great deal slower than the speed of movement of a cathode ray beam in a system in which only one elemental area of the screen is illuminated at the receiver at a given instant.

There will be reproduced at the receiver in the medium 80 shown in Fig. 5 a series of compressional beams of different frequencies, arranged in horizontal layers, which, so far as their frequency arrangement is concerned, are like the layers of compressional beams of the transmitter in Fig. 3. On the other hand, while at the transmitter the compressional beams were all of equal amplitude, at the receiver the amplitude of each compressional beam is determined by the amplitude of its corresponding frequency component in the received signal. An arrangement of the kind used at the transmitter being suitable, since the crystal is a linear device. Since the crystal will be driven by the various compressional beams of different frequencies and amplitudes, it will be advantageous to shunt the crystal to provide a broad band frequency response. From the previous description of the transmitter it will be understood that the luminosity of the various picture elements of the vertical line being transmitted at any given instant determines the amplitudes of the frequency components of the transmitted signal. At the receiver, the light which is transmitted through that portion of the medium included between a pair of horizontal plates will hence be determined by the luminosity of a particular elemental area of the film at the transmitter. This light at the receiver is focused by the cylindrical lens 104 so that it falls on an elemental area of the viewing screen.

To summarize, at any instant the 441 elements of a vertical line of the picture at the transmitter will control the amplitudes of the 441 frequency components generated by the photocell 50. The 441 frequency components of the transmitted signal produces 441 compressional beams at the receiver. Each of these compressional beams will control light which is focused by a cylindrical lens into one picture element of a vertical strip on the viewing screen. In this manner, a vertical strip of the picture at the transmitter is transmitted and reproduced as a vertical strip of a picture on the viewing screen. As a result of the horizontal movement of the photocells at the transmitter, various vertical strips of the picture at the transmitter are scanned in succession, and the synchronized movement of the mirror drum 106 at the receiver causes a synchronized scanning of the viewing screen 108 at the receiver, whereby the complete transmitted picture is reproduced at the receiver.

It may therefore be seen that there has been described, as a first embodiment, a system in which one line of the picture is transmitted at a time, the scanning from line to line being accomplished mechanically. A second embodiment will now be described in which the entire picture is transmitted continuously. In the first embodiment, the line which was transmitted was divided into various elemental areas by a novel device in the nature of a multiple ultrasonic light valve. In the second embodiment to be described, the entire picture will be divided into elemental areas by a somewhat different device in the nature of a multiple ultrasonic light valve representing an extension of the principles disclosed in the first-described embodiment.

*Second embodiment*

In the television system shown in Figs. 7 through 13, the entire picture is transmitted simultaneously, and consequently no scanning is necessary. In this embodiment information as to each picture element is transmitted by a different frequency component or narrow band of components, of the composite transmitted signal, the luminosity of the picture element being represented by the amplitude of its frequency component.

The transmitter may first be considered. As shown in Figs. 7 and 9, there is provided a tank 130 containing a transparent medium 132, such as water, through which a compressional wave may be propagated. At the left-hand end of the tank, set into the wall thereof, there is provided lens means 134, 136 and 138 through which light may be directed longitudinally of the tank. Means are provided for directing through the lens means 134, 136 and 138 light corresponding to the picture or scene to be transmitted. In some embodiments a live scene may be transmitted. In the present embodiment, for the sake of illustration, it may be assumed that a picture on a film, such as a motion picture film, is to be transmitted. For this purpose there is provided a source 140 of light, a film 142 bearing a picture, and lens means 144 and 146 for directing light from the source 140 through the film 142 and thence toward the lens 134.

Suspended in the tank 130 at a position out of the path of the light from the lenses 134—138, and at an oblique orientation, is a piezoelectric crystal 148. This crystal may be seen in the lower, left-hand corner of the tank, as viewed in Fig. 9, and also as viewed in Fig. 11.

A source 150 of multifrequency electrical signals is connected to the crystal 148 for setting up vibrations of ultrasonic frequency therein, whereby compressional waves are generated in the transparent medium 132. The signal source 150 may be of the type described as 28 in the previous embodiment. The ultrasonic compressional wave should include, as nearly as practical, a continuous spectrum of frequency components, all of equal amplitude.

As best shown in Fig. 9, a prism 152 is positioned to receive the multifrequency compressional waves from the crystal 148 and is adapted to spread out these compressional waves into diverging components or beams, transmitting them upwardly and toward the right, as viewed in Fig. 9. The components of higher frequency will be bent the most, and those of lower frequency will be bent the least.

A cylindrical lens 154, the shape of which may best be seen in Fig. 9, positioned on the near side of the tank as shown in Fig. 7, is adapted to receive the upwardly-moving compressional waves from the prism 152 and to direct them generally horizontally along the tank, without altering their path as seen in plan view.

As may be seen in Fig. 7, the compressional waves from the lens 154 and the light rays entering through the lenses 134—138 are, at this point, traveling along generally parallel paths longitudinally of the tank 130, the light extending through most of the tank and the compressional waves being confined largely toward the near side of the tank.

In the path of compressional waves from the lens 154 is a prism 156, formed to have a triangular cross-sectional shape, when viewed in horizontal section, this cross-sectional shape being uniform in all horizontal sectional planes. In other words, this prism is in the shape of a right triangular parallelopiped. The apical edge of the prism points generally outwardly of the tank, as shown in Fig. 7. This prism is adapted to receive compressional waves from the lens 154 and to disperse them, as viewed in plan view, as seen in Fig. 7.

These compressional waves then pass through a cylindrical lens 158 which, as seen in plan view in Fig. 7, has a convex face, and serves to spread them out still more. The lens 158, in vertical section, is of zero power. The compressional waves then strike a transparent cylindrical lens 160, which is convex in horizontal cross section, as shown in Fig. 7, and which is of zero power in vertical section. The lens 160 serves to direct the compressional waves longitudinally of the tank. The combined effect of prism 156, lens 158 and lens 160 is to provide parallel layers of compressional waves in the plane of Fig. 7 in the same manner that the combined effect of prism 152 and lens 154 provides parallel layers of compressional waves in the plane of Fig. 10. The result is a two-dimensional parallel array. The longitudinally-moving compressional waves now fill the major portion of the cross section of the tank 130, and thus move along the same paths as the light entering through the lenses 134—138. No effective diffraction of the light will be produced under this condition, it being necessary in order to produce diffraction, that the wave fronts of the compressional waves be parallel to the light path, or stated differently, that the path of propagation of the compressional waves be perpendicular to that of the light.

Horizontal separating plates 162 are provided for separating the compressional waves into horizontal layers, and for preventing them from interfering with one another. These plates extend toward the left to a point between the lens 154 and the prism 156. The prism 156, the lens 158, and the lens 160 all extend vertically through suitable openings in the plates 162. Alternatively there might be employed separate prisms between the various plates. There may be 442 of the plates 162, so as to divide the compressional waves and also the light into 441 horizontal layer-like beams.

It may be observed that of the layer-like compressional beams, there is a variation in frequency across the width of the tank. Thus, as viewed from the right-hand end of the tank, the higher frequency components of each layer would be located toward the right progressively lower frequency components being located toward the left.

The light moving longitudinally of the tank may be considered divided into layer-like beams by the plates 162. Means are provided for directing each of these light beams for a short distance along a path perpendicular to the path of propagation of the compressional beams, that is, parallel to the wave fronts of the compressional beams, so that in this region the compressional beams may diffract the light beams. The light beams are then redirected in their original direction. With this arrangement, together with an array of bars and slits, to be described, it is possible to produce for each picture element a light signal varying at a narrow band of ultrasonic frequencies uniquely characteristic of that picture element, the amplitude of the light signal being determined by the luminosity of the picture element. The band of ultrasonic frequencies for each picture element may, for example, be about 20 cycles wide. All the light signals are collected by a single photocell, thereby producing the desired composite electric signal, which may be transmitted.

As best shown in Fig. 12, the plates 162 are toward their right-hand ends bent downwardly at an angle of 45 degrees. The downwardly-extending portions may be identified as 163. The portions 163 have on both sides light-reflecting surfaces. In some embodiments they, together with the main portions of the elements 162, may be of polished aluminum.

As indicated in Fig. 12, the downwardly-extending portions 163 are adapted to reflect the light downwardly in zones such as 164. The lower surface of one of the downwardly extending portions 163 reflects the light downwardly along a vertical path, and the upper surface of the next lower portion 163 reflects the light horizontally to the right along a path parallel to its original path. The length of the portions 163 and their spacing should be so adjusted that the light is reflected downwardly once and then when it is again reflected to the right, it may without interruption pass away from the portions 163 without being reflected again.

The light beams pass through the compressional beams before the compressional beams strike the portions 163, and therefore any effect which the portions 163 might have on the compressional beams cannot affect the light beams.

In zones such as 164, where the light beams move along paths perpendicular to the direction of propagation of the compressional waves, the light beams are refracted, according to the same principle as was mentioned in connection with the first embodiment described herein.

While the layer-like compressional and light beams between the plates 162 are not actually divided into pencil-like portions, it may be convenient to think of them as comprising such pencil-like portions arranged side by side. As thus conceived, each pencil-like portion of a light beam would originate from one picture element. If there are 441 layer-like beams, and 441 pencil-like portions in each layer, there would be $441^2$ pencil-like portions. Each of the pencil-like portions of the compressional beams would be of slightly higher frequency than its adjacent portion on one side and of slightly lower frequency than the portion on its other side. Each pencil-like compressional beam portion would control or provide a unique ultrasonic "carrier" frequency or band for the pencil-like light beam portion with which it coincides. Hence each picture element has its own "carrier" frequency or carrier band.

Extending across the right-hand end of the tank there is a membrane 166 of cellophane, sealing the medium 132 from a zone 168 to the right of the membrane 166. In the zone 168 there is provided an absorbing medium 170, such as castor oil.

The major portion of the right-hand end of the tank 130 is formed of a transparent substance, such as plastic or glass. This transparent section may be identified as 172. The outer surface of this transparent portion 172 is formed to have 441 convex, horizontal, cylindrical, lens surfaces 174, as shown in Fig. 12. Opposite each of the cylindrical lenses 174 there is a horizontally-extending bar 176 having a slit to either side thereof. The members 163, the lenses, and the bars are so aligned that in the absence of compressional waves substantially all the light would, after passing through the lenses, strike the bars 176. On the other hand, with the compressional waves present, the light which passes through a particular pencil-like portion of a compressional beam is caused first to strike its bar and then to pass through the adjacent slits, varying at the ultrasonic frequency of that particular pencil-like portion of the compressional beam through which it has passed.

The light rays emerging from the slits between the bars 176 strike a condensing lens 178, which focuses the light rays to approximately a point, at which there is located a photocell 180. The photocell 180 is connected to an amplifier 182 and serves with this amplifier to provide an electrical signal which may be transmitted over a suitable transmission channel. It will be understood that there may be employed transmitting means of a variety of types, as was explained with the previous embodiment, and the amplifier 182 may be considered to represent generally any suitable transmitting apparatus.

In connection with the second embodiment there has been described thus far apparatus at a transmitting station for generating from a picture on a film or from a live scene which is to be televised a composite electric signal having a large number of frequency components or bands, for example $441^2$, each corresponding to a particular picture element of the picture. The frequency of the component identifies the picture element to which it corresponds. The amplitude of the component conveys information as to the luminosity of its picture element.

*Receiver of second embodiment*

Reference is now made to Figs. 8, and 10 through 13.

The transmission channel, which may be identified by the reference numeral 190, is, at the receiver, connected to suitable receiving apparatus schematically represented as an amplifier 192. There is provided at the receiver a tank 130*a* which, together with all elements within it, may be similar to or exactly like the tank 130 described in connection with the transmitter. Elements in Figs. 8 and 10 bear the same reference numerals as their corresponding elements in Figs. 7 and 9, with the addition of the suffix "*a*."

At the receiver there is provided a light source 194 to the left of the tank, together with lenses 196 for directing light longitudinally of the tank. There is at the receiver, however, no film corresponding to the film 142 at the transmitter, and no scene is projected through the tank. The purpose of the light source in the lens at the receiver is to supply light which, in a manner to be described, is modulated in various zones and projected onto a screen to reproduce the picture transmitted by the incoming signal.

It may be noted that the views in Figs. 11, 12 and 13 may be considered to illustrate details of the tank 130*a* at the receiver, shown in Figs. 8 and 10, as well as details of the tank at the transmitter shown in Figs. 7 and 9.

The lens surfaces on the outer side of the transparent section at the right-hand end of the tank 130*a* at the receiver, together with the bars 176*a* and slits cooperating therewith, are just like those at the transmitter.

Light leaving the slits passes through a lens 195 and is directed onto a screen 198.

The mode of operation of the receiver is as follows:

The incoming multifrequency electrical signal drives a piezoelectric crystal 148*a*, which generates compressional waves in the medium 132*a* within the tank 130*a*. These waves, by prisms 152*a* and 156*a* and lenses 154*a* and 158*a*, are directed longitudinally of the tank in layer-like compressional beams, which may be considered to comprise pencil-like portions, each pencil-like portion being of different frequency. Light from a source 194 at the left-hand side of the tank 130*a* is also directed longitudinally of the tank in the same direction as the direction of propagation of the compressional beams. Downwardly-extending light-reflecting portions similar to 163 reflect the light through short zones along paths which cross the propagation paths of the compressional beams at right angles, and these light-reflecting portions then again reflect the light toward the right and out of the tank. As a result, each pencil-like portion of the light beams is refracted by an amount related to the amplitude of the particular portion of the compressional beam through which it passes.

Recalling from the previous description of the transmitter that each component of the transmitted signal corresponds in frequency to the position of a particular element of the picture to be transmitted, and bearing in mind that the effect of the prisms and lenses 152*a* to 158*a* is to arrange the frequency components of the compressional waves in space according to their frequency, it may be understood that the position of each of the pencil-like portions of the compressional beams at the receiver will correspond to the position of its associated element of the transmitted picture.

Since the amplitude of a particular frequency component of the transmitted signal is determined by the luminosity of its associated picture element, it may be seen that the amplitude of the corresponding portion of the compressional beams at the receiver will be similarly determined.

The individual portions of the compressional beams at the receiver, together with the bars, slits, and associated means, act as light valves for controlling the light striking individual portions of the screen 198 so that the transmitted picture is reproduced on the screen. Any variation in the picture on the screen at an ultrasonic rate is, of course, too rapid to be noted by the eye of the observer.

It may, therefore, be seen that in the television system described as a second embodiment, an entire picture may be transmitted simultaneously without scanning, by a complete frequency-division system, with the aid of a novel type of piezoelectric apparatus at the transmitter and the receiver.

While a suitable form of apparatus and method to be used in accordance with the invention have been described in some detail, and certain modifications have been suggested, it will be understood that numerous changes may be made without departing from the general principles and scope of the invention.

What is claimed is:

1. Light modulating apparatus comprising a medium capable of transmitting light and compressional waves, means for setting up in said medium compressional waves having a plurality of frequency components, means in said medium for dispersing said waves into a plurality of component beams differing in frequency, means for forming said beams into a plurality of parallel compressional beams, each of a a separate band of frequencies, means for directing light from each of a plurality of luminous elements of an image scene through said medium along a path crossing the path of one of said parallel beams substantially perpendicular to the direction of travel and parallel to the wave front of said beam, and optical means in the path of the light from each of said luminous elements adapted to set up electrical signals related in amplitude to the intensity of the luminescence of the luminous element and in frequency to the frequency of the compressional beam through which it has passed.

2. Light modulating apparatus for use in a television transmitter comprising a medium capable of transmitting light and compressional waves, means for setting up in said medium a plurality of compressional waves having a plurality of frequency components, means in said medium for dispersing said waves into a plurality of compressional beams, equal to the number of elements to be defined in a line of an image scene and differing in frequency from one another, means for forming said beams into a like plurality of parallel compressional beams each of a separate band of frequencies, means for directing a light beam from each element of one line of an image scene through said medium along a path crossing the path of one of said parallel beams substantially perpendicular to the direction of travel and parallel to the wave front of said beam, optical means in the path of each of said light beams adapted to set up electrical signals related in amplitude to the intensity of the luminescence of the corresponding element in the line of the image scene and in frequency to the frequency of the compressional beam through which it has passed.

3. A light modulating apparatus for a television system comprising a medium capable of transmitting light and compressional waves, means for setting up in said medium compressional waves having a plurality of frequency components, means in said medium for dispersing said waves in a horizontal direction into a plurality of component beams differing in frequency from one another, means in said medium for collimating said beams in a horizontal direction and forming a plurality, equal to the number of the elements to be defined along a horizontal line of an image scene, of parallel beams each of a separate band of frequencies, means in said medium for dispersing each of said parallel beams in a vertical direction into a plurality of component beams differing in frequency from one another, means in said medium for collimating said last-mentioned beams in a vertical direction and forming a plurality, equal to the number of horizontal lines to be defined in an image scene, of parallel beams each of a separate band of frequencies, the above-mentioned dispersing and collimating means forming a two-dimensional array of parallel beams, equal to the number of elements to be defined in the image scene, means for projecting light from each element of the image scene through said medium along a path which is initially coincident with a path of a separate one of the two-dimensional array of compressional beams, means in said medium for diverting the light from each element for a short distance to a direction which is perpendicular to the direction of propagation of said array, further means in said medium for redirecting the light from each element in a new path in the direction of propagation of said array, and optical means in said new path of the light from each element, adapted to set up electrical signals related in amplitude to the intensity of the luminescence of a corresponding element of the image scene and in frequency to the frequency of the compressional beam through which it has passed.

WARREN P. MASON.

REFERENCES CITED

The following references are of record in the file of this patent:

UNITED STATES PATENTS

| Number | Name | Date |
|---|---|---|
| 1,961,706 | Pajes | June 5, 1934 |
| 2,155,660 | Jeffree | Apr. 25, 1939 |
| 2,158,990 | Okolicsanyi | May 16, 1939 |